July 26, 1949.  F. B. GROUP  2,477,124
CHUCK
Filed May 31, 1946
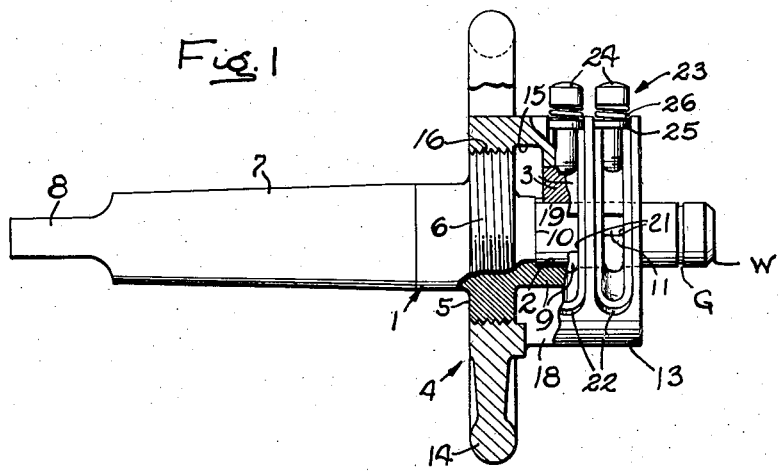
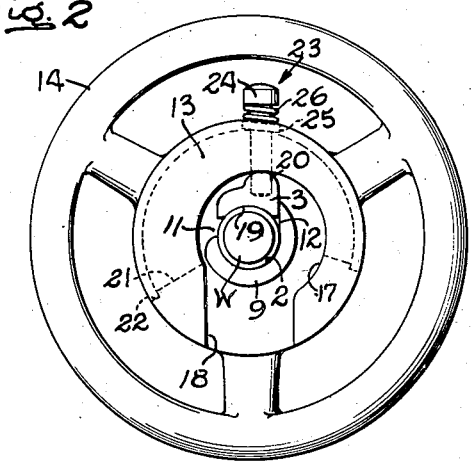
INVENTOR.
Frank B. Group
BY
Carlson, Pitzner, Hubbard & Wolfe
attys Patented July 26, 1949

2,477,124

UNITED STATES PATENT OFFICE 2,477,124

CHUCK

Frank B. Group, Detroit, Mich., assignor to Ex-Cell-O Corporation, Detroit, Mich., a corporation of Michigan Application May 31, 1946, Serial No. 673,569

5 Claims. (Cl. 279—71)

The present invention relates generally to improvements in chucks, and specifically to lathe chucks having quick-acting means for locking and releasing the workpieces positioned therein.

One of the objects of the present invention is to provide a novel lathe chuck having locking means operable simply through a partial rotation of a hand actuator to locate and secure a cylindrical workpiece accurately in position both in an axial direction and in concentric relation to the axis of rotation.

Another object is to provide a new and improved quick-locking lathe chuck which comprises comparatively few parts and is simple and inexpensive in construction, and which is efficient and reliable in operation.

Further objects and advantages will become apparent as the description proceeds.

In the accompanying drawings,

Fig. 1 is a side elevational view, partially in section, of a lathe chuck, embodying the features of the invention.

Fig. 2 is an end view of the chuck.

Referring more particularly to the drawings, the chuck constituting the exemplary embodiment of the invention, comprises a body member 1 having a socket 2 for receiving a cylindrical workpiece W, a clamping block or shoe 3 movable peripherally and radially to lock the workpiece in position, and a reversible cam actuator 4 for applying and releasing the shoe.

The body member 1 comprises an intermediate circular flange 5 formed with a peripheral screw thread 6. To provide suitable means of support, the flange 5 is rigid at one side with a coaxial taper shank 7 adapted to be inserted in a lathe spindle (not shown), and having a driving tang 8 on the extreme end. The other side of the flange 5 is rigid with a coaxial extension 9 formed with an axial bore constituting the work socket 2. The inner end of the bore or socket 2 is closed, and is peripherally undercut so as to provide a flat end face 10 disposed for abutment by the inner end of the workpiece W to locate the latter in a predetermined axial position. Consequently, the workpiece may be machined at different points in definite relation to its longitudinal dimension, as, for example, to turn a peripheral groove G at a predetermined distance from the inner end. The inner surface of the socket 2 is cylindrical to receive an accurately finished cylindrical workpiece W of the same diameter with a close complemental fit. However, one side of the socket 2 is open, as indicated at 11, longitudinally throughout the major portion of its length and transversely through approximately 180°, so that the socket in effect defines a semi-cylindrical seat. One side edge of the opening 11 is extended tangentially to provide a stop surface 12.

The cam actuator 4 comprises a generally cylindrical housing 13 having a concentric external handwheel 14 rigid with one end. The housing 13 is formed in one end with a concentric internal bore 15 adapted to receive the flange 5, and formed with internal threads 16 adapted for engagement with the threads 6. By reason of the threaded connection, the actuator 4 is rotatably supported on the flange 5, and rotation thereof through a portion of one revolution will effect a slight axial shift through a portion of the thread pitch. The outer end portion of the housing 13 is formed with a large eccentric bore 17 connecting with the bore 15, and opening at one side through a wide slot 18 to the external periphery. The inner surface of the bore 17 extends freely and eccentrically about the socket projection 9, and in effect constitutes a cam surface.

The clamping block or shoe 3 is frictionally restrained against the cam surface 17, and disposed for engagement with the periphery of the workpiece W through the open side of the socket 2. The block 3 has a recessed partial-cylindrical clamping face 19 located in substantially opposed relation to the semi-cylindrical work seat, and conforming in transverse curvature to the periphery of the work. At the outside, the block 3 is formed with a narrow longitudinal bearing rib 20 arranged in sliding engagement with the cam surface 17.

To provide suitable means for securing the block or shoe 3 operatively in position for wedge bearing engagement between the workpiece W and the cam surface 17, the housing 13 is formed with two axially spaced slots 21 which open from the exterior to the interior, and which extend peripherally through a major portion of the circumference. The slots 21 are widened at their outer edges to provide shallow guide grooves 22. Two screws 23, with socket heads 24 at their outer ends, are extended respectively through the slots 21 into threaded engagement with the shoe 3. The shanks of the screws 23 extend through washers 25 suitably guided in the grooves 22, and coil compression springs 26, interposed between the heads 24 and the washers, tend to urge the screws outwardly so as to maintain the shoe 3 in frictional sliding engagement with the surface 17.

In operation, assuming that the shoe 3 is in retracted position, the workpiece W is inserted in the socket 2. Then, the wheel 14 is rotated in a clockwise direction, as viewed in Fig. 2, to apply the shoe 3 to the work. In the initial rotation, the shoe 3 will be revolved with the housing 13 until it engages the stop surface 12. Thereafter, continued rotation of the housing 13 will result in relative movement of the cam surface 17 across the rib 20 to cam the shoe 3 quickly and securely with a heavy clamping pressure against the exposed periphery of the workpiece and in opposed relation to the work seat. In the course of this movement, the screws 23 slide along the slots 21. The slight axial shift of the housing 13, occasioned by the lead of a partial convolution of the screw threads 6 and 16 serves to insure end abutment of the workpiece against the locating surface 10. Consequently, the workpiece is quickly and accurately located and clamped in centered and endwise position.

To release the workpiece, the wheel 14 is rotated in a counterclockwise direction. In the initial rotation, the cam surface 17 moves across the rib 20 to release the shoe 3 from contact with the workpiece. Ultimately, the trailing ends of the slots 21 engage the screws 24 to revolve the shoe 3 completely out of registration with the side opening in the cage or socket 2. The finished workpiece may now be removed laterally through the slot 18, and another workpiece inserted.

I claim:

1. A rotary chuck comprising, in combination, a body member adapted to be secured to a rotary support and having an axial cylindrical work-receiving socket with a locating surface at the inner end and a longitudinal opening along one side, an actuator rotatable on said body member and having an eccentric cylindrical bore extending freely about said socket, a clamping shoe frictionally confined against the inner surface of said bore for movement with said actuator into and out of registration with said opening, and means on said body member for restraining said shoe against movement in one direction with said actuator beyond said opening, whereby continued rotation of said actuator will cam said shoe into said opening for engagement with the work in said socket.

2. A rotary chuck comprising, in combination, a body member adapted to be secured to a rotary support and having an axial cylindrical work-receiving socket with a longitudinal opening along one side, an actuator rotatably threaded coaxially on said body member and having an eccentric cylindrical bore extending freely about said socket, a clamping shoe frictionally confined against the inner surface of said bore for movement with said actuator into and out of registration with said opening, means on said body member for restraining said shoe against movement in one direction with said actuator beyond said opening, whereby continued rotation of said actuator in said direction will cam said shoe into said opening for engagement with the work in said socket, and means on said actuator for picking up said shoe and revolving it out of registration with said opening upon rotation of said actuator in the reverse direction.

3. A rotary chuck comprising, in combination, a body member adapted to be secured to a rotary support and having an axial cylindrical work-receiving socket with a locating surface at the inner end and a longitudinal opening along one side, an actuator rotatable on said body member coaxially about said socket and having an eccentric cylindrical bore defining a cam surface extending freely about said socket, a clamping shoe slidably confined against said cam surface for movement with said actuator into and out of registration with said opening, and for relative movement to adjust said shoe radially of said socket, spring actuated means having a peripheral lost motion connection with said actuator for maintaining said shoe yieldably against said cam surface, and means on said body member for restraining said shoe against movement in one direction with said actuator beyond said opening, whereby upon continued rotation of said actuator said cam surface will force said shoe into said opening for clamping engagement with the work in said socket.

4. A rotary chuck comprising in combination, a body member adapted to be secured to a rotary support and having an axial cylindrical work-receiving socket with a locating surface at the inner end and a longitudinal opening along one side, a coaxial actuator rotatably threaded on said body member and having an eccentric cylindrical bore defining a cam surface extending freely about said socket, said actuator having a slot opening to one side of said eccentric bore, a clamping shoe slidably disposed against the inner surface of said bore for movement through frictional contact with said actuator into registration with said opening, a peripheral slot in said actuator opening to said bore, a spring-actuated screw extending through said slot into threaded engagement with said shoe to maintain said shoe frictionally against said cam surface, means for restraining said shoe against movement in one direction with said actuator beyond said opening, whereby continued rotation of said actuator will cam said shoe into said opening for clamping engagement with the work in said socket, and means for positively insuring movement of said shoe in the opposite direction out of registration with said opening.

5. A rotary chuck comprising, in combination, a body member adapted to be secured to a rotary support and having an axial work-receiving socket with a locating surface at the inner end and an opening in one side, an actuator rotatably threaded on said body member and having an eccentric cam surface extending transversely about said socket, and a clamping shoe shiftable radially through coaction with said cam surface, resilient means frictionally confining said shoe against said cam surface for movement with said actuator into and out of registration with said opening, said actuator being operable in the course of rotation simultaneously to impart to said shoe a radial thrust through the action of said cam surface and an end thrust through the lead action of the threaded connection between said actuator and body member.

FRANK B. GROUP.

REFERENCES CITED

The following references are of record in the file of this patent:

UNITED STATES PATENTS

| Number | Name | Date |
|---|---|---|
| 420,016 | McCool | Jan. 21, 1890 |
| 866,245 | Wahlstrom | Sept. 17, 1907 |
| 1,341,085 | Tarbutton | May 25, 1920 |
| 1,379,986 | Holtman | May 31, 1921 |
| 1,740,377 | Snyder et al. | Dec. 17, 1929 |

FOREIGN PATENTS

| Number | Country | Date |
|---|---|---|
| 14,443 | Great Britain | 1885 |